(12) United States Patent
Valentian

(10) Patent No.: US 6,901,955 B2
(45) Date of Patent: Jun. 7, 2005

(54) CRYOGENIC ROTARY COUPLING, AND USE THEREOF IN PARTICULAR IN ARTICULATED FLUID FEED LINES, AND IN CRYOGENIC PROPELLANT ROCKET ENGINES

(75) Inventor: Dominique Valentian, Rosny-sur-Seine (FR)

(73) Assignee: SNECMA Moteurs, Paris (FR)

(*) Notice: Subject to any disclaimer, the term of this patent is extended or adjusted under 35 U.S.C. 154(b) by 153 days.

(21) Appl. No.: 10/617,600

(22) Filed: Jul. 11, 2003

(65) Prior Publication Data

US 2004/0055642 A1 Mar. 25, 2004

(30) Foreign Application Priority Data

Jul. 12, 2002 (FR) .......................................... 02 08819

(51) Int. Cl.⁷ ................................................ E03B 1/00
(52) U.S. Cl. ...................... 137/580; 137/312; 137/341; 137/565.33; 138/114; 244/172; 60/39.35
(58) Field of Search ................................ 137/580, 341, 137/312; 60/39.35; 138/113, 114; 244/172

(56) References Cited

U.S. PATENT DOCUMENTS

| | | | | |
|---|---|---|---|---|
| 3,234,728 A | * | 2/1966 | Christian et al. ............. | 60/204 |
| 3,331,404 A | * | 7/1967 | Gehring et al. ................ | 141/91 |
| 3,466,886 A | * | 9/1969 | Doose et al. .................. | 62/50.7 |
| 4,609,169 A | * | 9/1986 | Schweickert et al. ........ | 244/169 |
| 6,135,138 A | | 10/2000 | Richards, Jr. | |
| 6,314,978 B1 | * | 11/2001 | Lanning et al. ................ | 137/1 |

FOREIGN PATENT DOCUMENTS

EP 0 709 616 A 5/1996

* cited by examiner

*Primary Examiner*—A. Michael Chambers
(74) *Attorney, Agent, or Firm*—Weingarten, Schurgin, Gagnebin & Lebovici LLP (57) ABSTRACT

The cryogenic rotary coupling comprises segments of a cryogenic line that are capable of turning relative to each other about a pivot axis of the rotary coupling. Radial retaining elements and axial retaining elements define the pivot axis of the rotary coupling. One of the segments comprises a vacuum-insulated double-walled female portion and the other segment comprises a vacuum-insulated double-walled male portion engaged at least in part in the female portion. A first sealing gasket is interposed between a free end of the male portion engaged in the female portion and one of the retaining means. A second sealing gasket is interposed between a free end of the female portion surrounding the male portion and the other one of the retaining elements. A heater device is disposed in the vicinity of the second gasket.

24 Claims, 5 Drawing Sheets

CRYOGENIC ROTARY COUPLING, AND USE THEREOF IN PARTICULAR IN ARTICULATED FLUID FEED LINES, AND IN CRYOGENIC PROPELLANT ROCKET ENGINES

FIELD OF THE INVENTION

The present invention relates to a cryogenic rotary coupling and to the use of such a coupling in particular in articulated cryogenic fluid feed lines and in cryogenic propellant rocket engines.

PRIOR ART

Couplings with elastomer gaskets cannot be used at cryogenic temperatures, given that the minimum temperature at which such couplings can be used is restricted to −50° C.

Proposals have already been made for couplings that are usable at cryogenic temperatures, but without such couplings being capable of turning, which greatly restricts the advantages of such couplings.

Examples of cryogenic rotary couplings are given in patent documents EP 0 188 161, U.S. Pat. No. 6,135,138, and EP 0 709 616.

Document EP 0 188 161 describes a device forming a rotary gasket for cryogenic liquid usable in an industrial application such as transporting liquefied natural gas (LNG). The LNG line is surrounded by a coaxial annular space for return of cold vapor.

Document U.S. Pat. No. 6,135,138 describes a device suitable for use in particular in cooling infrared sensors on a satellite. Such a device uses a triaxial disposition with a central duct for liquid nitrogen, a coaxial duct for cold vapor, and a second coaxial duct enabling leakage from the gaskets to be recovered.

Document EP 0 709 616 describes a rotary coupling using fibrous thermal insulation between two coaxial walls, axial forces being centered and taken up by a ball bearing that is rigid at ambient temperature, preceded by two sealing gaskets in series. The annular space is closed on the cryogenic fluid side by a facing gasket or by a labyrinth type device.

Such types of rotary coupling used on the ground present a structure that is relatively complex or bulky which, in addition, is unsuitable for operating in an environment subject to high levels of vibration and acceleration, as applies, for example, in a space launcher vehicle.

OBJECT AND BRIEF SUMMARY OF THE INVENTION

An object of the invention is to remedy the drawbacks of the above-mentioned devices and to enable cryogenic rotary couplings to be made of a design that leads to small weight and size, while also being capable of withstanding high levels of bending generated by vibration or by acceleration.

The invention also seeks to provide a cryogenic rotary coupling of reasonable cost that presents a high degree of safety in operation and that accommodates large amounts of angular displacement.

Specifically, the invention seeks to provide a cryogenic rotary coupling capable of being used equally well for industrial applications on the ground and for applications in space, in particular in the context of rocket engines, where it is essential to reduce on-board weight and size while guaranteeing reliability and flexibility of operation in an environment where vibration and acceleration generate high levels of force on the on-board structure.

These objects are achieved by a cryogenic rotary coupling, comprising a first cryogenic line segment and a second cryogenic line segment capable of turning relative to each other about a pivot axis of the rotary coupling, first retention means for retaining one of the first and second cryogenic line segments in the radial direction, second retention means for retaining one of the first and second cryogenic line segments in the axial direction relative to the other one of said first and second segments, the radial retention means and the axial retention means defining said axis of rotation of the rotary coupling, said first segment comprising a vacuum-insulated double-walled female portion and said second segment comprising a vacuum-insulated double-walled male portion engaged at least in part in said female portion, a first sealing gasket being interposed between a free end of said male portion engaged in said female portion and one of the first and second retaining means, a second sealing gasket being interposed between a free end of said female portion surrounding said male portion and the other one of said first and second retaining means, and heater means being disposed in the vicinity of the second gasket.

A cryogenic rotary coupling of this type makes it possible to reduce friction torque during turning and is suitable for use in a horizontal position while preventing the rotary gasket from freezing because of the heating that is provided.

Various particular characteristics enable the reliability of the sealing and the quality of the rotary coupling to be improved.

The first gasket is a self-lubricating insert cooperating with a seat associated with one of the first and second retaining means.

Advantageously, the self-lubricating insert is made out of one of the following materials: polytetrafluoroethylene (PTFE), polytrifluorochloroethylene (PTFCE), filled graphite, PTFE-filled bronze, filled ceramic.

According to a particular characteristic, the self-lubricating insert is provided with a slot serving to balance pressures between the internal zone of the first and second segments and the annular space defined between the overlapping male and female portions.

According to another particular characteristic, the self-lubricating insert is provided with an induced-elasticity device serving to distribute contact pressure over the seat while also forming a safety valve.

The second gasket may be a flexible wiper gasket co-operating with the outside surface of the male portion in the vicinity of the radial retention means.

Nevertheless, in another embodiment, the second gasket is a rectangular section annular gasket applied against a plane portion associated with the axial retention means.

Advantageously, the second gasket which is permanently maintained at ambient temperature, in particular because of the heater means, is made of elastomer or of PTFE.

In an advantageous embodiment, the heater means comprise an electrical heater device.

Nevertheless, the heater means may also be implemented in some other form, and for example may comprise a device for heating by forced convection.

The second retention means for retaining in the axial direction comprise a dry-lubricated axial abutment including a large diameter ball bearing.

By way of example, the vacuum-insulated double-walled female and male portions are made of stainless steel or of nickel superalloy.

In a particular embodiment, a wire or a section member of insulating material is wound helically in the internal space between the vacuum-insulated double walls of the female and male portions.

In an advantageous embodiment, the internal portion of the vacuum-insulated double walls of the female and male portions is made of an iron alloy having about 36% nickel, such as the alloy known under the name Invar.

In an application to a high pressure rotary coupling, such as a rotary coupling placed at the outlet from a turbopump, for example, and receiving a cryogenic fluid under a pressure of about 100 bars to 200 bars, the vacuum-insulated double walls of the female and male portions are preferably provided with internal reinforcement formed by separating insulator pellets of very low thermal conductivity.

In which case, and advantageously, metal sheets forming screens against radiation are disposed between the vacuum-insulated double walls in alternation with the insulating pellets.

According to another advantageous characteristic of the invention, conduction-cooled zeolite is integrated between the vacuum-insulated double walls of the female and male portions.

The cryogenic rotary coupling of the invention is particularly suitable for application to a cryogenic fluid feed line connecting a stationary assembly to a moving assembly and presenting at least one degree of freedom.

Such a feed line may include, for example, three cryogenic rotary couplings on parallel axes implemented in accordance with the invention.

The invention also provides a liquid cryogenic propellant rocket engine having at least one propellant storage tank, a turbopump for feeding a propellant injection device, a combustion chamber having a nozzle throat and a nozzle diverging portion, and at least one actuator for modifying the position of the combustion chamber of the rocket engine relative to a stationary chamber-supporting structure, the rocket engine including at least one coupling of the invention disposed on a line for feeding said turbopump from said propellant storage tank or on a line for feeding said propellant injection device from said turbopump.

Such a rocket engine can be integrated in a launcher upper stage and can then comprise a combustion chamber whose axis is substantially perpendicular, to within ±15°, to the longitudinal axis of the launcher in its launch configuration.

Advantageously, the rocket engine has an axis of rotation situated at the throat of the nozzle.

The rocket engine may include two turbopumps mounted in positions that are fixed relative to the launcher and having outlet pipes for feeding the fuel propellant injection device that are respectively provided with at least one cryogenic rotary coupling of the invention to enable the rocket engine to tilt about at least one pivot axis relative to the launcher.

Thus, from an operational point of view, the invention makes it possible to increase the angular amplitude through which a cryogenic rocket engine can be turned, by using cryogenic rotary couplings of the invention to allow the rocket engine to be steered.

In particular, the use of the thermal decoupling device together with localized heater makes it possible to use a rotary gasket that operates at ambient temperature while the propellant remains at a cryogenic temperature.

When steering a rocket engine, the angular range through which it can be turned can be considerably greater than the 6° made possible merely by using a bellows. This is particularly advantageous for recoverable launchers.

The invention also makes it possible to steer without changing line volume, and thus without varying pressure.

In very advantageous manner, the invention also makes it possible to reduce the height between stages in a launcher by placing the engine substantially perpendicularly to the longitudinal axis of the launcher.

On engine test beds and in ground services for launchers (umbilical elements), the invention makes it possible to replace vacuum-insulated flexible lines which generate high levels of force and are very bulky with a vacuum-insulated line having three couplings of the invention, thus providing two degrees of freedom in translation and one degree of freedom in rotation, with the degree in freedom in rotation being advantageously used to take the feed interface off its hinges.

In these applications on the ground, there is vacuum continuity between the line segments and the couplings, thus simplifying implementation.

For the arm of a launcher fueling vehicle, since the lines are smaller, the aerodynamic forces are smaller as are the moving masses: the force specifications on the check valve plates are therefore less severe.

This application can be extended to any connection between a stationary cryogenic tank and a vehicle. It provides a solution that is more compact than one making use of a flexible line.

BRIEF DESCRIPTION OF THE DRAWINGS

Other characteristics and advantages of the invention appear from the following description of particular embodiments, given as examples and with reference to the accompanying drawings, in which.

DETAILED DESCRIPTION OF PARTICULAR EMBODIMENTS

Figure 1:
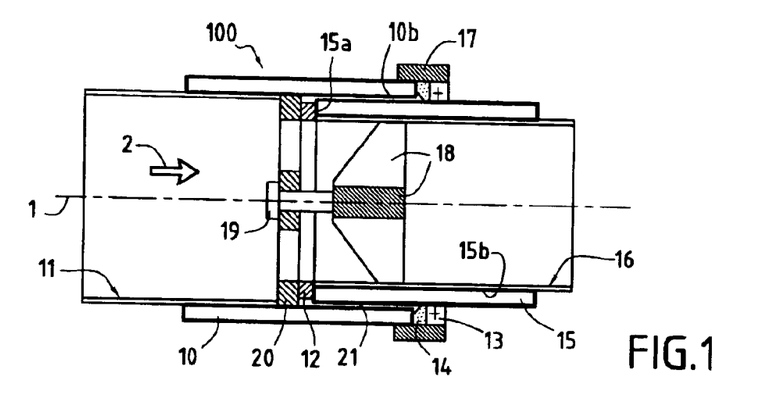
FIG. 1 is a diagrammatic axial section view of a first embodiment of a cryogenic rotary coupling of the invention.

Reference is made initially to FIG. 1 which is a section view of a particular cryogenic rotary coupling 100 of the invention.

The cryogenic fluid flows, e.g. in the direction of arrow 2, along a cryogenic line comprising line segments 11, 16, one of which is free to turn relative to the other.

In the example of FIG. 1, the segment 11 constitutes an upstream segment and the segment 16 constitutes a downstream segment, however in other embodiments, the fluid flow direction could be reversed relative to that shown by arrow 2.

The pivot axis 1 of the coupling, i.e. of a line segment 16 relative to another line segment 11, is defined firstly by an axial abutment 19 and secondly by a centering ring 13.

The axial abutment 19 serves to take up end forces and it co-operates with the centering ring 13 to take up bending loads due mainly to accelerations, both quasi-static acceleration and dynamic acceleration.

The centering ring 13 is at ambient temperature and may be constituted by a ball bearing.

The axial abutment 19 may have a smooth bearing or a ball bearing. It uses dry lubrication techniques that are compatible with cryogenic fluids. By way of example, the axial abutment 19 can thus comprise elements of Ag—$MoS_2$, balls of $Si_3N_4$, and a cage of bronze-PTFE composite material.

Figure 4:
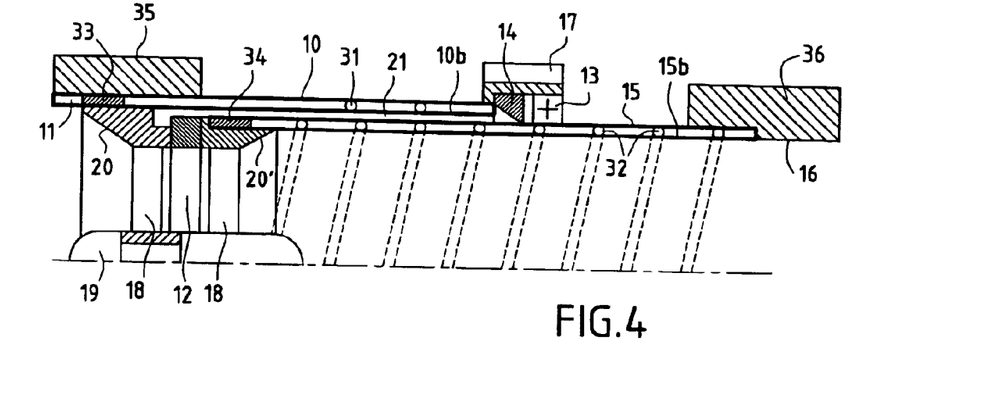
FIGS. 4 and 5 are axial half-section views of two particular embodiments of cryogenic rotary couplings of the invention showing assembly details of thin thermally-insulated double walls.
Figure 5:
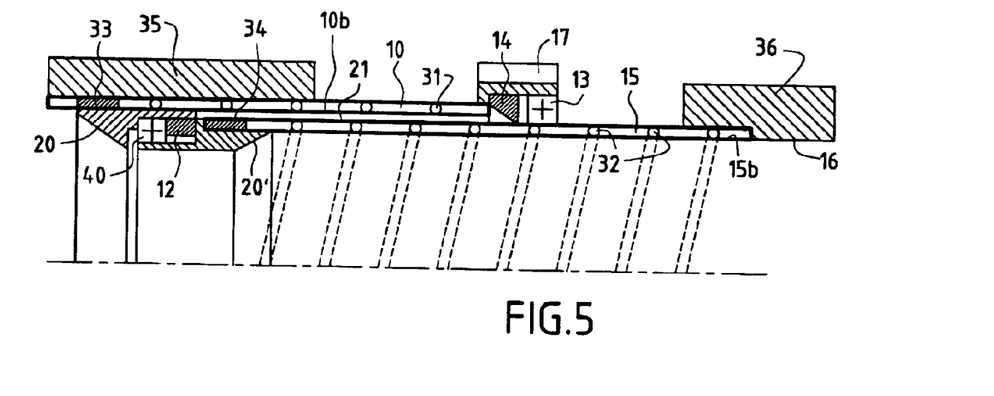

In the example of FIGS. 1, 4, and 5, the rotary coupling 100 comprises a female portion 10 secured to line segment 11 and constituted by a vacuum-insulated double wall, and a male portion 15 secured to line segment 16 and likewise constituted by a vacuum-insulated double wall. The male portion 15 is engaged in part in the female portion 10.

A self-lubricating insert 12 of annular shape, and of square section, for example, bears against a seat 20 of the axial abutment 19 and is also in contact with the free end 15a of the male portion 15 via a seat 20' of the axial abutment 19 (FIGS. 4 and 5).

The self-lubricating insert 12 provides sealing relative to the cryogenic fluid.

This insert may be made, for example, of PTFE, PTFCE, filled graphite, PTFE-filled bronze, or filled ceramic, which solution is recommended for liquid oxygen. It may also be provided with an induced elasticity device, e.g. constituted by a bellows 38 (FIG. 3) in order to distribute contact pressure over the seat 20.

Figure 3:
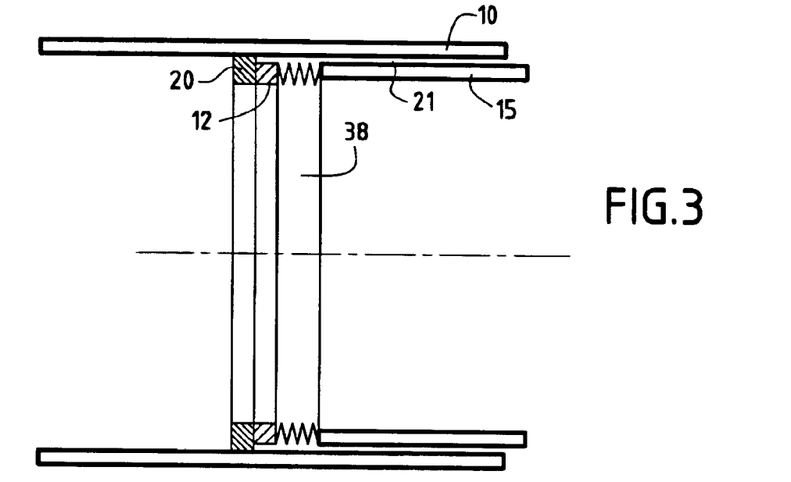
FIG. 3 is a view of a portion of the FIG. 1 rotary coupling in a variant using an insert with induced elasticity.

The induced elasticity device 38 has a second function: it acts as a safety valve. If a volume of liquid accidentally penetrates into the annular space 21 (e.g. under the effect of pyrotechnical shock opening the gasket 12 during a fraction of a second), then the liquid will vaporize on coming into contact with the hot walls and that will increase pressure to an extent that might damage the coupling. The induced elasticity device then makes it possible to lift the insert 12 and evacuate the excess gas.

Figure 2:
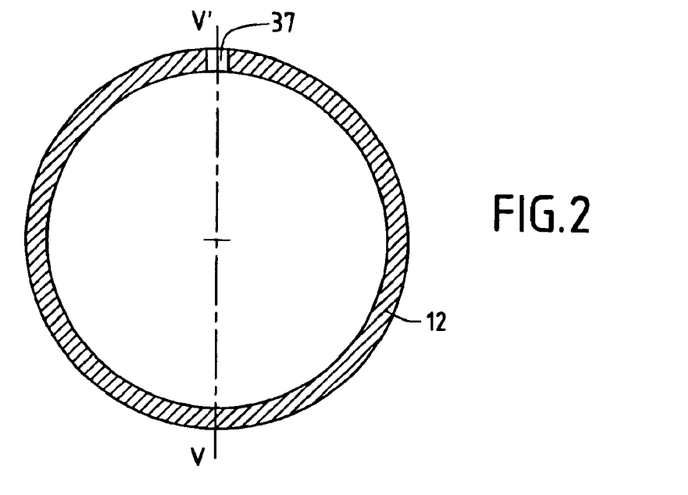
FIG. 2 is a section on a plane perpendicular to the axis of the FIG. 1 rotary coupling, showing an example of a split insert.

The same function may be performed merely by means of a slot 37 in the top portion of the insert 12 ensuring pressure equilibrium in the line and the annular space 21 between the double walls of the male and female portions 15 and 20. FIG. 2 shows an example of such a slot made in a vertical plane VV' of the rotary coupling.

Gas-tightness is provided by a wiper gasket 14 made of elastomer or of PTFE and operating at ambient temperature. This gasket co-operates with the centering ring 13 ensuring that it operates under good conditions. The annular space 21 is thus filled with gas at the pressure of the cryogenic liquid.

The temperature of the gasket is controlled by an electric heater 17, by forced convection, or by some other type of heater device. The surroundings of the gasket 14 may be very cold (thermal protection of the cryogenic engine or use on an upper stage in a vacuum and in shadow). The (electrical or other) heating thus serves to maintain a temperature that is acceptable for the gasket material. The heater means may be implemented in the form of a sleeve surrounding the gasket 14.

The gasket 14 can slide relative to the wall 15 so as to accommodate differential expansion.

This sliding may be replaced by a bellows assembly between the gasket 14, its centering ring 13, and the double wall 10, in particular for a high pressure coupling.

Heat flow via the gasket 14 is reduced by using vacuum-insulated double walls, thus eliminating heat flow by convection. Radiant flux can also be eliminated, if necessary, by means of a superinsulator. The materials used for making the double walls, for example stainless steel or a nickel superalloy, presents thermal conductivity that is particularly low at cryogenic temperatures, thus contributing to reducing heat flow.

For double walls having a mean diameter of 100 millimeters (mm), a length of 100 mm, and a thickness of 1 mm, being made of stainless steel having an integral of thermal conductivity of 30.5 watts per centimeter (W/cm) in the temperature range 20 K to 300 K, heat loss P by conduction in that range of 20 K to 300 K is restricted to:

$$P = 30.5 \times 6.3/10 = 19 \text{ watts}$$

It is thus very easy to keep the gasket at a desired temperature merely by supplying electricity at equivalent power to the heater device 17, assuming that it is of the electrical type.

The electrical heater device 17 is preferably capable of supplying higher power and is preferably temperature limited, either by on/off control or by using a material that becomes insulating above a determined temperature. This additional power makes it possible to handle an accidental intrusion of liquid into the gap 21.

The gap 21 between the portions 10 and 15 is minimized so as to reduce dead volume, and thus reduce the quantities of cryogenic liquid that might penetrate therein.

The torque opposing turning is very low. The friction forces of the lip gasket 14, the insert 12, and the two bearings 19 and 13 can be minimized by construction (the bearings 19 and 13 can be ball bearings). The only large force is the bearing 19 taking up end forces.

The diametral size of the coupling 100 can be reduced by acting on the thickness of the double walls of the female and male portions 10 and 15. When superinsulation is not used, these double walls can be quite close together. In order to avoid any accidental contact between them (due to ovalization), a wire 31, 32 or a square section member of insulating material and wound helically on the inside wall 10b, 15b suffices to avoid this possibility (FIGS. 4 and 5).

Reducing diametral size serves to reduce the end effect and thus the force on the axial abutment 19. The second advantage is a weight saving, which is particularly advantageous in a stage of a launcher.

The level of the vacuum in the double walls of the female and male portions 10 and 15 can be improved by using zeolite 33, 34 cooled by conduction through the wall. Even if a small leak degrades the static vacuum, cooling brings pressure down to below $10^{-1}$ Pascals (Pa) (thereby eliminating convection and conduction in the residual gas).

The axial abutment 19 can be replaced by a large diameter ball bearing 40 (FIG. 5) making it possible to eliminate the central obstruction due to the cross 18 for holding the axial bearing and increasing the stiffness of the rotary coupling.

In order to enable pressure to be balanced more easily, the insert 12 providing liquidtightness may merely be split in its top portion (FIG. 2). Any vapor coming from an accidental leak past the insert is then naturally evacuated. Since the opening is situated at the top, liquid does not penetrate into the annular space 21 in normal operation.

In order to eliminate the need to have a bellows compensating for expansion between the outer and inner portions 10b, 15b of a double wall of the male portion 15 or of the female portion 10, the inner wall 10b, 15b can be made of an iron alloy having about 36% nickel, such as the alloy known under the name Invar.

As already mentioned, the female and male portions 10 and 15 of the line segments 11 and 16 may have evacuated double walls with superinsulation (FIG. 1) or may present double walls that are close together (FIGS. 4 and 5). Insulating foam 35, 36 may also be provided on the line segments 11, 16, partially covering the female and male portions 10 and 15.

These dispositions are particularly suitable, for example when a rotary coupling is placed between a fuel propellant tank and a turbopump of a rocket engine, for example. Under such circumstances, since the pressure in the tanks is relatively low, of the order of 2 bars to 5 bars, it is relatively easy to ensure that the outer portion of an evacuated double wall is strong enough to avoid local buckling.

Figure 6:
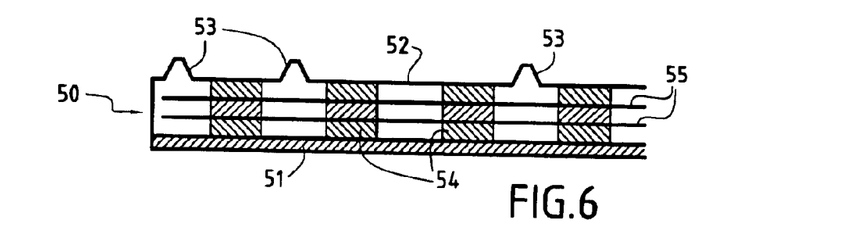
FIG. 6 is a detail view of another embodiment of a vacuum double wall suitable for being integrated in a high pressure cryogenic rotary coupling of the invention.

In contrast, if a rotary coupling is placed under high pressure conditions, for example pressures of about 100 bars to 200 bars, as applies for example when the rotary coupling is placed between the delivery outlet of a turbopump and a device for injecting cryogenic propellants, then the evacuated double walls needs to be fitted with reinforcement, e.g. like the double wall 50 shown in FIG. 6.

In FIG. 6, internal reinforcement is built up from stacks of separator pellets 54 of very low thermal conductivity inserted inside the double wall 50.

In order to reduce heat losses by conduction and by radiation, the reinforcement may comprise insulating pellets 54 alternating with metal sheets 55 constituting anti-radiation screens extending parallel to a base wall 51.

This disposition makes it possible to take advantage of the non-linear variation in thermal conductivity as a function of temperature. The double wall may be cylindrical or conical. One of the individual walls 51 and 52 is preferably provided with corrugations 53 enabling said wall to be pressed against the reinforcement 54, 55 under the effect of pressure. The corrugations 53 thus enable differential expansion to be compensated.

Figure 7:
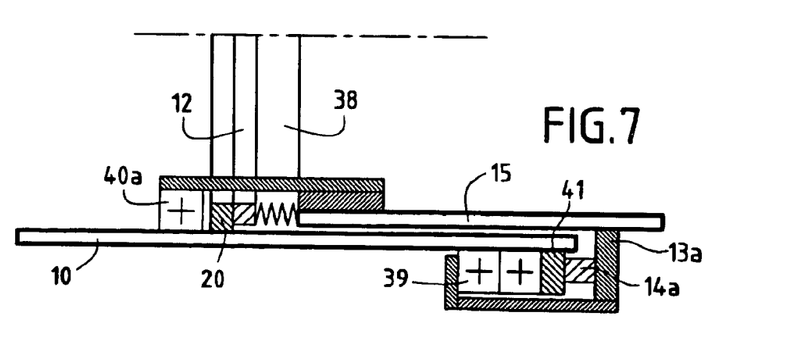
FIG. 7 is an axial half-section view of an example of a rotary coupling of the invention adapted to a high pressure application.

In a variant, in an application to high pressure fluids, as shown in FIG. 7, the flexible wiper gasket 14 may be modified so that it does not have a lip and constitutes a gasket 14a pressed merely against a plane portion 13a of the bearing which then acts as the axial abutment 39. In which case, the bearing 40 of FIG. 5 constitutes a radial bearing 40a and the self-lubricating insert 12 is carried by an induced-elasticity support 38 in order to compensate for differential expansion between the two portions of the coupling. The annular gasket 14a is essentially rectangular in section and is connected to the female portion 10 by a backing insert 41 and makes face-to-face contact.

Figure 12:
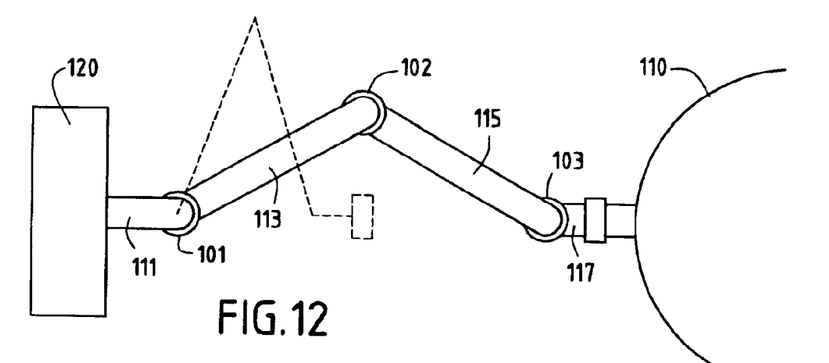
FIGS. 12 and 13 are respectively a plan view and a side view of one example of the rotary coupling of the invention in use as an articulated cryogenic fluid feed line.
Figure 13:
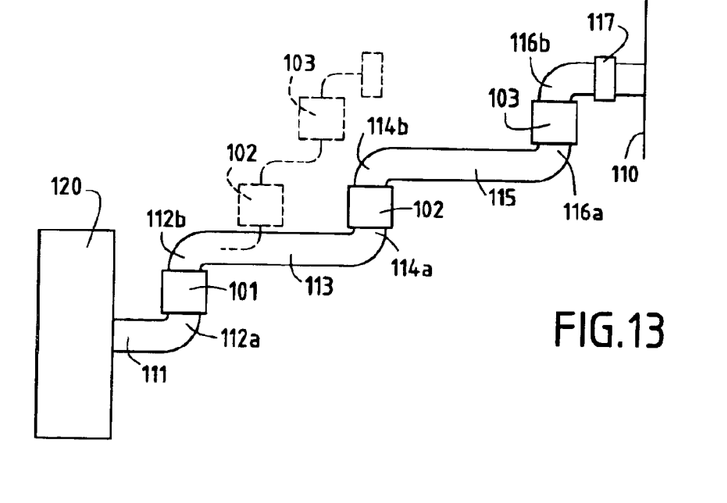

As shown in FIGS. 12 and 13, cryogenic rotary couplings 101, 102, and 103 of the invention and possibly presenting axes that are parallel can be interposed between line segments 111, 113, 115, and 117 that are also preferably mutually parallel, and possibly associated with bends such as 117a, 117b, 114a, 114b, 116a, and 116b. Each rotary coupling thus provides one degree of freedom in rotation.

FIGS. 12 and 13 show an articulated line with coupling size being reduced, allowing cryogenic fluid to be transferred between a stationary installation 120 and a moving installation 110, with a retracted position being represented by dashed lines. Such articulated lines can be used in the following applications:

fueling a vehicle (a fuel cell car or bus, an airplane, a ship);

filling a fixed storage tank from a truck; and a launch pad.

When fueling a launcher stage, these lines are much lighter than those in existing solutions and they present much less windage, which reduces forces on launcher-to-ground connections.

FIGS. 8 to 11 show applications of the cryogenic rotary coupling of the invention to rocket engines using cryogenic liquid propellants.

In an application to a rocket engine, the angle through which a leaktight rotary coupling of the invention can turn lies in the range a few degrees to 180° depending on mission requirements.

All of the electrical connections and small section fluid lines are provided by a bundle of cables and flexible hoses forming a sheet that can turn through a range of angles.

Two bearings enable the cradle to pivot and take up thrust, the two rotary couplings being colinear.

For an upper stage, the longitudinal axis XX' of the engine is substantially perpendicular (±15° in order to optimize the position of the diverging portion of the engine) to the axis YY' of the launcher when in the launch configuration. The engine is held in position either by an actuator, or else by bolts disposed on the skirt and holding the diverging portion of the nozzle.

The structure comprising the bearings on an axis perpendicular to the tilt axis and taking up the thrust of the chamber is provided with orifices for passing the lines and the bellows together with interfaces optionally enabling turbopumps to be installed. It is also provided with an attachment point for the angular steering actuator.

The structure and the cradle may be made of metal or of composite material. They may constitute a monocoque structure, thus also making it possible to have a thermal protection function against radiation from the nozzle (when the nozzle is cooled by radiation) or against radiation from the sun.

Propellant feed can take place via rotary couplings both on the axis providing a large angular range and on an axis having a small angular range. The turbopumps can either be parallel or perpendicular to the axis of the engine. The turbopumps may be fixed relative to the launcher, with four high pressure rotary couplings allowing the nozzle to be steered with two degrees of freedom.

With a gas regenerator cycle, the turbopumps are mounted on the cradle and the chamber is fed with propellant via two high-pressure rotary couplings placed on the axis of the structure (inside the bearings). This serves to reduce the angular inertia of the chamber.

Figure 8:
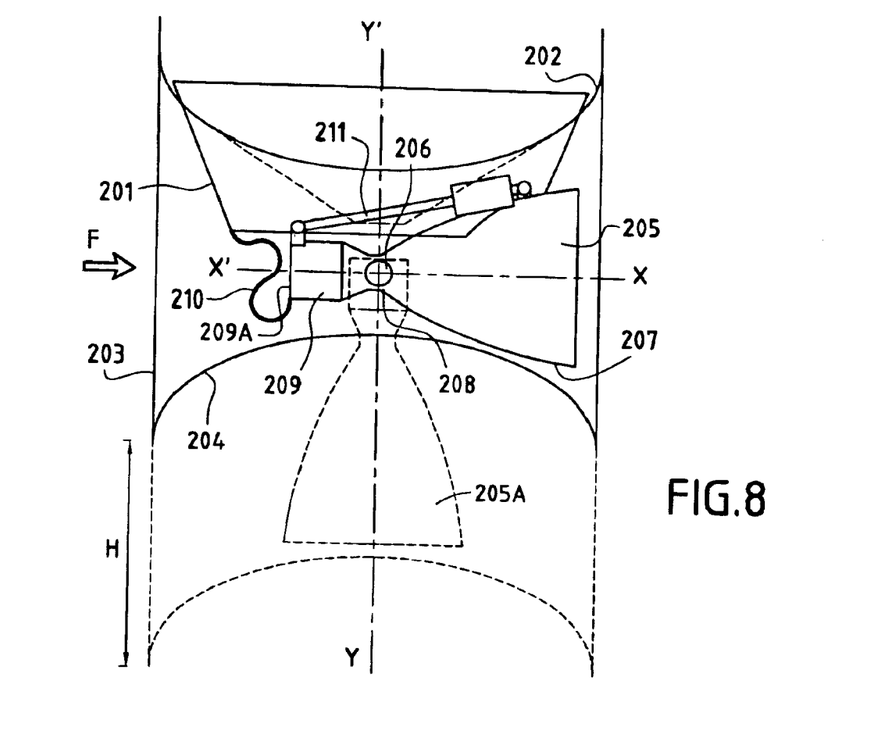
FIGS. 8 and 9 are diagrammatic views of a rocket engine fitted with rotary couplings of the invention, respectively in the plane of symmetry of the space between stages in a launcher and in a direction seen looking along arrow F of FIG. 8 that is perpendicular to said plane of symmetry.

FIG. 8 is a section through a rocket engine 205 placed in the space between stages defined by a skirt 203 in a launcher that has a lower stage 204 and an upper stage 202. The skirt 201 constituting a container supporting the engine 205 is connected to the upper stage 202. The engine 205 is held in position either by an actuator 211 connected to the support structure 201 of the engine 205, or by bolts placed on the same structure 201 and holding the diverging portion 207 of the engine nozzle which presents a throat 208 and a combustion chamber 209.

The longitudinal axis X'X of the engine 205 is substantially perpendicular to the axis Y'Y of the launcher, thus providing a considerable saving in height compared with the traditional disposition 205A shown in dashed lines in FIG. 8. The saving in height is represented by the height H.

All of the electrical connections and the small section fluid lines are provided by a bundle of cables and flexible hoses forming a sheet 210 that allows angular displacement to take place. This disposition gives easy access to the top of the injector 209A, thus making it very easy to change the ignitor.

As shown in FIG. 8, the engine pivot axis 206 is preferably not placed at the top of the combustion chamber 209, but is shifted to be level with the throat of the nozzle 208 so as to maximize engine length and thus extract maximum benefit from the room available in the space between stages.

Figure 9:
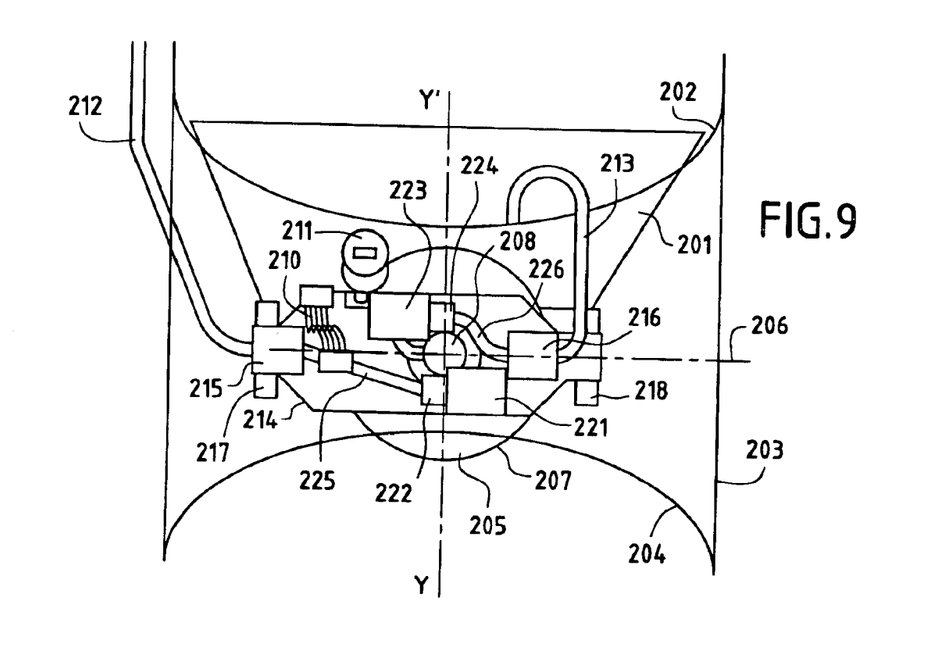

FIG. 9 is a section view on a plane extending perpendicularly to the longitudinal axis XX' of the rocket engine 205 and containing the pivot axis 206 of the engine 205.

FIG. 9 shows both the inter-stage skirt 203 and the skirt 201 which transmits thrust to the upper stage 202 of the launcher from the engine 205 once it has been tilted into its operating position.

References 217 and 218 designate the two bearings enabling the cradle 214 to be turned about the axis 206 and enabling it to take up thrust.

The engine 205 is fed by two turbopumps 221, 223 preceded by bellows 222, 224 enabling angular displacement to be obtained about the axis perpendicular to the tilt axis 206. The bearings on the axis perpendicular to the tilt axis 206 are not shown.

FIG. 9 shows two rotary couplings 215, 216, feed lines 212, 213 upstream from the rotary couplings 215, 216, and feed lines 225, 226 interposed between the rotary couplings 215, 216 and the turbopumps 221, 223. The actuator 211 and the flexible lines 210 can also be seen in FIG. 9.

Figure 10:
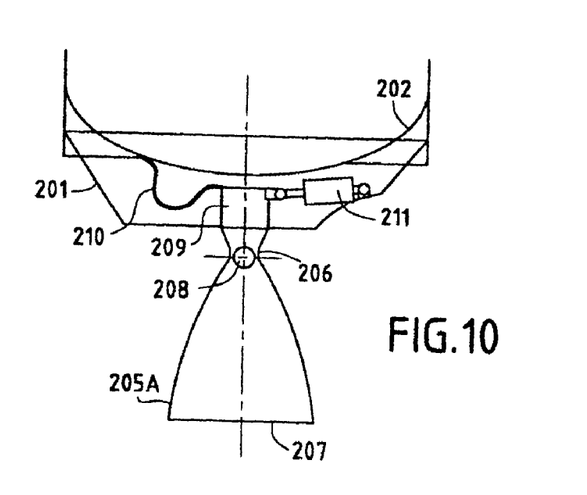
FIG. 10 is a diagrammatic side view of the rocket engine of FIGS. 8 and 9 in its nominal position.

FIG. 10 shows the engine in the firing position. The actuator 211 has been used for bringing the engine 205 into its firing position 205A by turning it about the axis 206.

The function of the actuator 211 may be subdivided into two portions, a first portion serving to provide a long and fixed deployment stroke from the launch position to the firing position 205A, and a second portion serving to deliver a smaller stroke about the mean position 205A so as to allow the engine to be steered through about ±6°, for control purposes.

It may be observed that compared with the embodiment shown in FIGS. 8 to 10, the axis 206 could be placed level with the diverging portion 207 instead of level with the neck 208 of the nozzle. Nevertheless, under such circumstances it is necessary to increase the height between the axis and the bottom of the tank in the upper stage 202, thereby reducing the height savings with respect to the inter-stage skirt 203. Positioning level with the throat 208 or close to the throat 208 is thus preferable.

With reference to FIG. 9, it can be seen that the hinges 217, 218 of the cradle 214 do not coincide with the rotary couplings 215, 216. These elements need to be colinear, but not necessarily one in the other. Although the ball bearings of the rotary couplings 215, 216 are capable of withstanding high radial forces, it is generally preferable to separate the functions of providing a rotary coupling and of taking up thrust.

Figure 11:
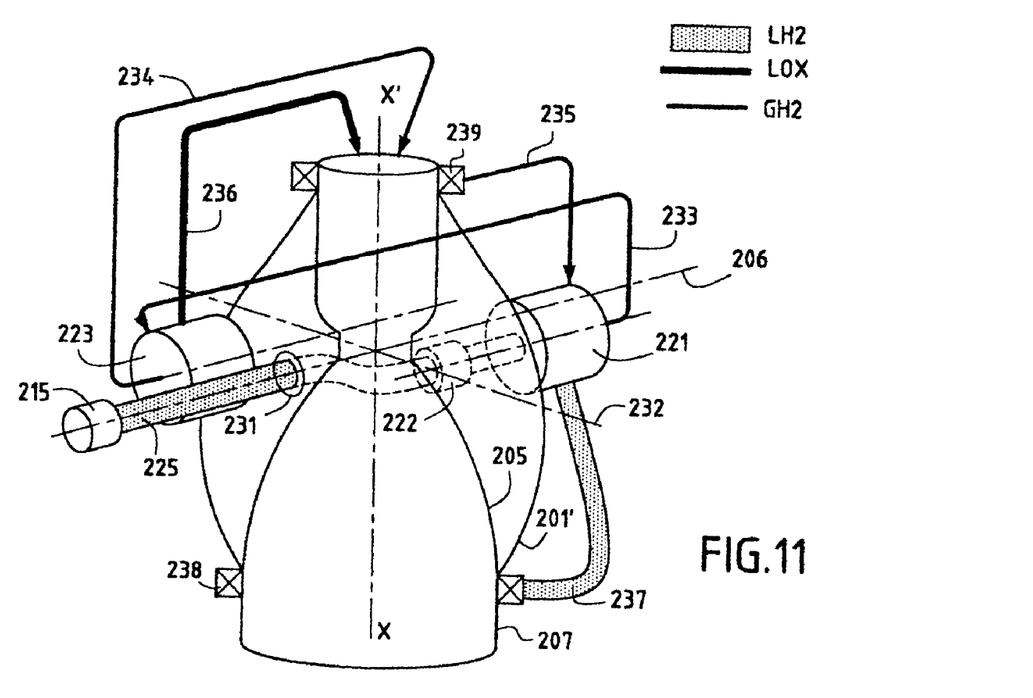
FIG. 11 is a perspective view showing an example of a structure supporting the combustion chamber of a rocket engine fitted with cryogenic rotary couplings of the invention.

FIG. 11 shows an example of a structure 201' which supports an axis 232 that is perpendicular to the 90° tilt axis 206 and that is capable of pivoting through about 5°, this axis serving to take up all of the thrust from the rocket engine chamber 205. The structure 201' is not shown in FIG. 9.

The structure 201' is provided with orifices 231 for passing the lines and the bellows. In FIG. 11, the turbopumps 221, 223 are shown as being flange-mounted.

In FIG. 11, the various lines 233 to 239 for transporting fluids such as LH2, GH2, LOX, are shown together with arrows indicating the flow directions of these various elements. The cycle shown in FIG. 11 is an expander cycle, but other configurations are naturally possible.

In particular, the turbopumps 221, 223 could be mounted parallel to the axis X'X of the rocket engine chamber 205.

It should be observed that measures enabling the height of the space between stages to be reduced in a launcher are of practical importance. Thus, by way of example, a configuration as shown in FIGS. 8 to 11 makes it possible to shorten the inter-stage skirt of a launcher by more than 2 meters (m), and this corresponds to a direct saving in weight that is put on orbit of more than 200 kilograms (kg) and to a great increase in the stiffness of the launcher, and thus to a reduction in the level of vibration to which the payload is subjected.

Such dispositions also make it possible to lengthen the stage within a given overall length for the launcher, thus making it possible to increase the structural index of the stage considerably.

The dispositions described above are also applicable to an engine having a deployable diverging portion. In particular, they make it possible to combine a plurality of functions in a single unit: engine thermal protection; engine cradle; and supports for the mechanism of the deployable diverging portion. Since the hinge can be situated close to the center of gravity of the engine, initial turning and activation of the nozzle for control purposes do not have undesirable influence on the attitude of the stage. The temperature of the propellant lines can be reduced at any time and the rotary couplings operate on a permanent basis, so there is no risk of the feed lines not being connected, which greatly increases the operating safety of the launcher.

What is claimed is:

1. A cryogenic rotary coupling, comprising a first cryogenic line segment and a second cryogenic line segment capable of turning relative to each other about a pivot axis of the rotary coupling, first retention means for retaining one of the first and second cryogenic line segments in the radial direction, second retention means for retaining one of the first and second cryogenic line segments in the axial direction relative to the other one of said first and second segments, the radial retention means and the axial retention means defining said axis of rotation of the rotary coupling, said first segment comprising a vacuum-insulated double-walled female portion and said second segment comprising a vacuum-insulated double-walled male portion engaged at least in part in said female portion, a first sealing gasket being interposed between a free end of said male portion engaged in said female portion and one of the first and second retaining means, a second sealing gasket being interposed between a free end of said female portion surrounding said male portion and the other one of said first and second retaining means, and heater means being disposed in the vicinity of the second gasket.

2. A rotary coupling according to claim 1, wherein the first gasket is a self-lubricating insert co-operating with a seat associated with one of the first and second retaining means.

3. A rotary coupling according to claim 2, wherein the self-lubricating insert is made out of one of the following materials: PTFE, PTFCE, filled graphite, PTFE-filled bronze, filled ceramic.

4. A rotary coupling according to claim 2, wherein the self-lubricating insert is provided with a slot serving to balance pressures between the internal zone of the first and second segments and the annular space defined between the overlapping male and female portions.

5. A rotary coupling according to claim 2, wherein the self-lubricating insert is provided with an induced-elasticity device serving to distribute contact pressure over the seat while also forming a safety valve.

6. A rotary coupling according to claim 1, wherein the second gasket is a flexible wiper gasket co-operating with the outside surface of the male portion in the vicinity of the radial retention means.

7. A rotary coupling according to claim 1, wherein the second gasket is a rectangular section annular gasket applied against a plane portion associated with the axial retention means.

8. A rotary coupling according to claim 6, wherein the second gasket is made of elastomer or of PTFE.

9. A rotary coupling according to claim 1, wherein the heater means comprise an electrical heater device.

10. A rotary coupling according to claim 1, wherein the heater means comprise a device for heating by forced convection.

11. A rotary coupling according to claim 1, wherein the first retention means in the radial direction comprise a centering ring.

12. A rotary coupling according to claim 1, wherein the second retention means acting in the axial direction comprise a dry-lubricated axial abutment including a large diameter ball bearing.

13. A rotary coupling according to claim 1, wherein the vacuum-insulated double-walled female portion and male portion are made of stainless steel or of nickel superalloy.

14. A rotary coupling according to claim 1, wherein a wire or a section member of insulating material is wound helically in the internal space between the vacuum-insulated double walls of the female and male portions.

15. A rotary coupling according to claim 1, wherein the internal portion of the vacuum-insulated double walls of the female and male portions is made of an iron alloy having about 36% nickel, such as the alloy known under the name Invar.

16. A rotary coupling according to claim 1, wherein the vacuum-insulated double walls of the female and male portions are provided with internal reinforcement formed by insulating separator pellets having very low thermal conductivity.

17. A rotary coupling according to claim 16, wherein metal sheets forming screens against radiation are disposed between the vacuum-insulated double walls in alternation with the insulating pellets.

18. A rotary coupling according to claim 1, wherein conduction-cooled zeolLite is integrated between the vacuum-insulated double walls of the female and male portions.

19. A cryogenic fluid feed line interconnecting a stationary assembly and a moving assembly, the line presenting at least one degree of freedom and including at least one cryogenic rotary coupling according to claim 1.

20. A feed line according to claim 19, having three of said cryogenic rotary couplings with parallel axes.

21. A liquid cryogenic propellant rocket engine having at least one propellant storage tank, a turbopump for feeding a propellant injection device, a combustion chamber having a nozzle throat and a nozzle diverging portion, arid at least one actuator for modifying the position of the combustion chamber of the rocket engine relative to a stationary chamber-supporting structure, the rocket engine including at least one coupling according to claim 1 disposed on a line for feeding said turbopump from said propellant storage tank or on a line for feeding said propellant injection device from said turbopump.

22. A rocket engine according to claim 21, the engine being integrated in an upper stage of a launcher, and including a combustion chamber of axis XX' that is substantially perpendicular to the longitudinal axis YY' of the launcher in the launch condition, to within ±15°.

23. A rocket engine according to claim 21, having a pivot axis situated level with the throat of the nozzle.

24. A rocket engine according to claim 21, having two turbopumps mounted in a position that is fixed relative to the launcher and having outlet ducts for feeding the propellant injection device, each of which is provided with at least one said cryogenic rotary coupling in order to allow the rocket engine to pivot about at least one pivot axis relative to the launcher.

* * * * *

UNITED STATES PATENT AND TRADEMARK OFFICE
CERTIFICATE OF CORRECTION

PATENT NO. : 6,901,955 B2  
APPLICATION NO. : 10/617600  
DATED : June 7, 2005  
INVENTOR(S) : Dominique Valentian et al.

It is certified that error appears in the above-identified patent and that said Letters Patent is hereby corrected as shown below:

Column 12, line 11, claim 18, "zeolLite" should read --zeolite--; and

Column 12, line 23, claim 21, "arid" should read --and--.

Signed and Sealed this

Seventeenth Day of October, 2006

JON W. DUDAS  
*Director of the United States Patent and Trademark Office*